United States Patent [19]

Lauterbach

[11] 4,317,365

[45] Mar. 2, 1982

[54] APPARATUS FOR THE MEASUREMENT OF THE MASS OF A FLOWING MEDIUM

[75] Inventor: Heinz Lauterbach, Esslingen, Fed. Rep. of Germany

[73] Assignee: Robert Bosch GmbH, Stuttgart, Fed. Rep. of Germany

[21] Appl. No.: 96,129

[22] Filed: Nov. 20, 1979

[30] Foreign Application Priority Data

Jan. 4, 1979 [DE] Fed. Rep. of Germany ....... 2900220

[51] Int. Cl.$^3$ .............................................. G01F 1/68
[52] U.S. Cl. .................................................... 73/204
[58] Field of Search ..................... 73/204, 861.63, 118; 338/25, 28, 308

[56] References Cited

U.S. PATENT DOCUMENTS

| | | | |
|---|---|---|---|
| 2,870,305 | 1/1959 | Ling | 73/204 X |
| 3,374,673 | 3/1968 | Trageser | 73/204 |
| 4,080,821 | 3/1978 | Johnston | 73/204 |
| 4,083,244 | 4/1978 | Agar et al. | 73/204 |

FOREIGN PATENT DOCUMENTS 603905   4/1978   U.S.S.R. ................................ 73/204

OTHER PUBLICATIONS

"Heated Sensor Finds Wide Applications in Fluid Flown Measurements", Datametrics Bulletin 600, pp. 13, 14, FIG. 7, 10/70.

*Primary Examiner*—Herbert Goldstein
*Attorney, Agent, or Firm*—Edwin E. Greigg

[57] ABSTRACT

An apparatus for the measurement of the mass of a flowing medium, such as for the measurement of the induced air mass in internal combustion engines which includes at least one temperature-dependent resistor film disposed in the flow of the medium, the temperature and/or resistance of the film being governed in accordance with the mass of the medium wherein the manipulated variable is a standard for the mass of the medium. The temperature-dependent resistor film is disposed in a region of stabilized flow in the flow cross section and, to this end, the temperature-dependent resistor film may be disposed either upstream of the narrowest cross section of a nozzle-like constriction wherein the pressure steadily decreases or in a gap having a laminar gap flow.

5 Claims, 6 Drawing Figures

APPARATUS FOR THE MEASUREMENT OF THE MASS OF A FLOWING MEDIUM

CROSS REFERENCE TO COPENDING APPLICATION

Of interest only is a copending application of Werner Grunwald et al, Ser. No. 96,071 filed Nov. 20, 1979 owned by the same assignee.

BACKGROUND OF THE INVENTION

The invention relates to an apparatus for the measurement of the mass of a flowing medium. An apparatus is already known for the measurement of the mass of a flowing medium in which a film resistor placed upon a carrier is used as the temperature-dependent resistor. In its application, the apparatus is also used in a Reynolds-number range in which a very unstable, laminar flow predominates. Laminar flow separations appear continuously in this situation which vary the heat-transfer coefficient and thus the measurement signal of the apparatus. However, a sharply fluctuating measurement signal is unsuitable for control purposes.

OBJECT AND SUMMARY OF THE INVENTION

The apparatus according to the invention has the advantage over the prior art that through the disposition of the temperature-dependent resistor film in a region of stabilized flow, a measurement signal is obtained which is smooth and as precise as possible.

It is particularly advantageous to place the temperature-dependent resistor in the region of a nozzle-like constriction in which a constant pressure reduction is assured in the direction of flow.

It is also advantageous to dispose the temperature-dependent resistor film in at least one narrow gap having a laminar gap flow.

The invention will be better understood as well as further objects and advantages thereof become more apparent from the ensuing detailed description of the preferred embodiments taken in conjunction with the drawings.

DESCRIPTION OF THE PREFERRED EMBODIMENTS

Figure 1:
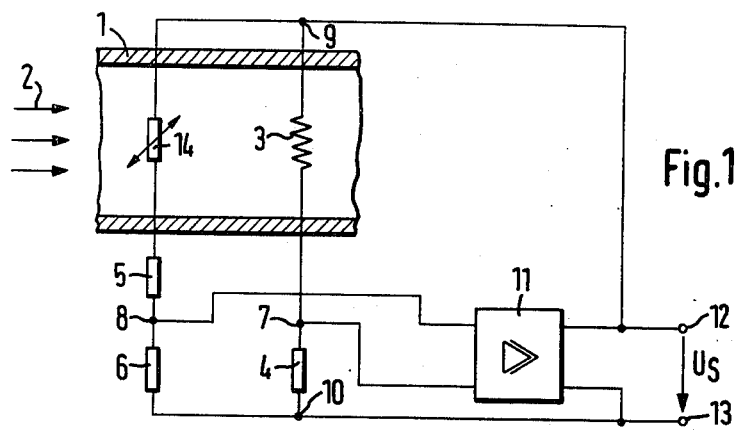
FIG. 1 is a schematic diagram of a basic circuit for an apparatus used to measure the mass of a flowing medium with the use of a temperature-resistant resistor.

Referring now to FIG. 1, there is shown an intake manifold 1 of an internal combustion engine (which is not further illustrated), into which the air induced by the engine flows in the direction indicated by the arrows 2. A temperature-dependent resistor 3, such as a hot-film resistor, is located in the intake manifold 1 and is subjected to the output value of a controller and simultaneously furnishes the input value for the controller. The temperature of the temperature-dependent resistor 3 is controlled to a fixed value which is above the average air temperature. If the flow velocity—that is, the quantity of air induced per unit of time—increases, then the temperature-dependent resistor 3 cools to a greater extent. This cooling is fed back to the input of the controller, so that the controller increases its output value in such a manner that the set temperature value is again established at the temperature-dependent resistor 3.

The output value of the controller governs the temperature of the temperature-dependent resistor 3, in accordance with variations in the induced air quantity, to the predetermined value and simultaneously represents a standard for the induced air quantity, which is delivered as a measurement value to a metering circuit in order to adapt the required quantity of fuel to the quantity of air induced per unit of time.

The temperature-dependent resistor 3, together with a resistor 4, comprises a first bridge arm, which has a second bridge arm connected parallel therewith comprising the two fixed resistors 5 and 6. Between the resistors 3 and 4, there is the pickup point 7, while the pickup point 8 is located between the resistors 5 and 6. The two bridge arms are connected in parallel at points 9 and 10.

The diagonal voltage of the bridge appearing between points 7 and 8 is applied to the input of an amplifier 11 having output terminals to which the points 9 and 10 are connected, so that the output value of the amplifier 11 supplies the bridge with operational voltage or operational current. The output value, designated from henceforth as the manipulated variable $U_S$ controls the metering of the fuel required for the induced air in a fuel metering circuit, (not illustrated) of the engine.

The temperature-dependent resistor 3 is heated up by the air flow passing through it, up to a value at which the input voltage of the amplifier 11, that is, the bridge diagonal voltage, becomes zero or assumes a predetermined value. From the output of the amplifier 11, a specific current flows into the bridge circuit. If the temperature of the temperature-dependent resistor 3 varies as a result of a variation in quantity of the induced air, then the voltage varies at the bridge diagonal, and the amplifier 11 governs the bridge supply voltage or the bridge current to a value for which the bridge is again balanced or is out of balance in a predetermined manner.

The output value of the amplifier 11, the control voltage $U_S$, thus represents a standard for the induced air quantity, just as does the current in the temperature-dependent resistor 3.

In order to compensate for the influence of the temperature of the induced air on the measurement results, it may be advantageous to include a second resistor 14, surrounded by a flow of induced air, in the second bridge arm. In so doing, the dimension of the resistors 5, 6 and 14 must be chosen such that the output loss of the temperature-dependent resistor 14, which is generated by the bridge arm current flowing through it, is so small that the temperature of this resistor 14 does not vary practically with the variations in the bridge voltage, but rather always corresponds to the temperature of the induced air flowing past it.

Figure 2:
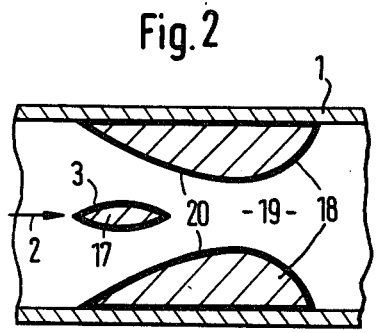
FIG. 2 is a sectional view of a flow cross section of one embodiment of a temperature-resistant film resistor in a nozzle-like constriction constructed in accordance with the invention.
Figure 3:
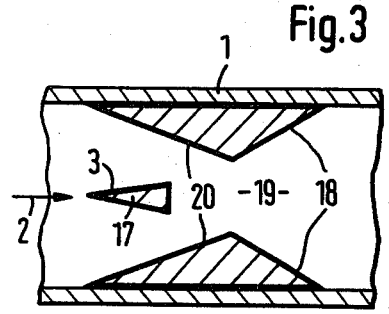
FIG. 3 is a view similar to FIG. 2 of another embodiment of the temperature-dependent resistor of the invention.
Figure 5:
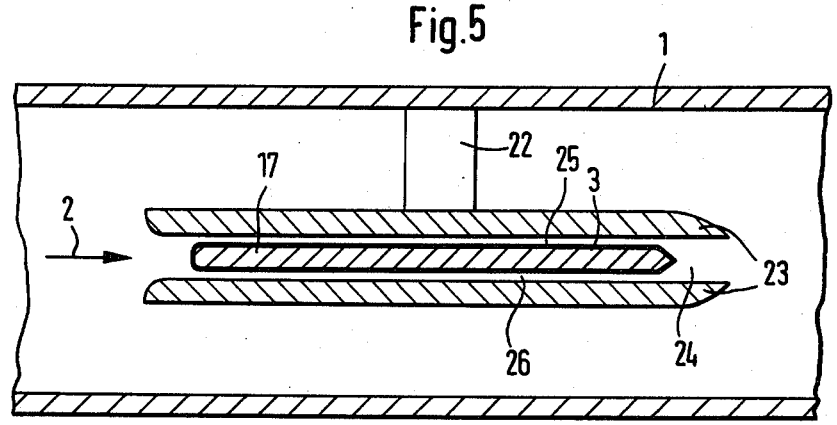
FIG. 5 is a sectional view of a temperature-resistant film resistor in at least one gap having a laminar gap flow constructed in accordance with the invention.

As is shown in FIG. 2, the temperature-dependent resistor 3 may be formed as a resistor film, which is placed upon a carrier 17 in accordance with any known process. If the carrier 17 is made of an electrically conductive material, then an insulating layer is provided between the resistor film 3 and the carrier 17. A nozzle body 18 is disposed in the flow cross section 1. This nozzle body 18 need not define the entire flow cross section but instead may also, as shown in FIG. 5, include only a portion of the flow of the medium.

Upstream of the narrowest cross section 19 of the nozzle body 18, in the embodiment of FIG. 2, the carrier 17 is disposed along with the temperature-dependent film resistor 3. The carrier 17 is formed, by way of example, as lenticular in shape. In other words, it is so formed that between the wall 20 of the nozzle-like constriction of the nozzle body 18 and the carrier 17, the resultant flow cross section narrows steadily in the direction of the flow. The pressure which thus also steadily decreases in the direction of flow toward the narrowest cross section 19 causes the boundary layer profile to be convex in shape and without any unsteadiness; i.e., no laminar flow separations appear. If the pressure were to rise in the flow direction instead, the boundary layer profile would have a turning point and a smaller velocity increase in the vicinity of the wall which would cause laminar separations that would appear irregularly both in time and in location.

The disposition of the carrier 17 with the temperature-dependent resistor 3 in the nozzle-like constriction of the nozzle body 18, in accordance with the invention, thus brings a stabilization of the flow, as a result of which a measurement signal can be obtained which is smoother and more precise.

Figure 4:
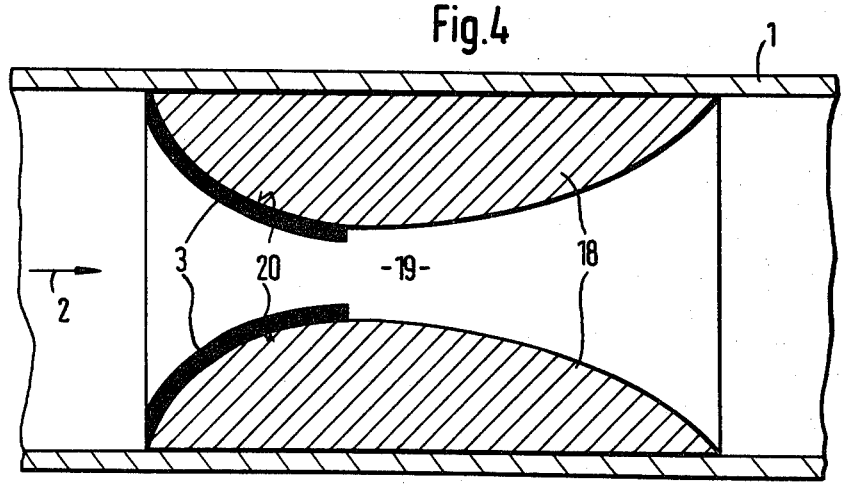
FIG. 4. is a view similar to FIG. 2 of a third embodiment of the temperature-dependent resistor of the invention.

In the embodiment of FIG. 4, the temperature-dependent film resistor 3 is applied directly to the wall 20 upstream of the narrowest cross section 19 of the nozzle-like constriction of the nozzle body 18. The nozzle body 18 thus serves simultaneously as the carrier of the resistor film 3. Because of the disposition of the temperature-dependent resistor film 3 pointing exclusively upstream on the nozzle body 18, the appearance of flow separations is prevented because of the steady reduction in pressure.

If there is a variation in the flow velocity and thus a change in the heat-transfer coefficient, the temperature distribution in the nozzle body 18 varies. The time which transpires until the new status is reached depends upon the heat capacity of the nozzle body 18. By means of a suitable selection of the mass and the surface area of the nozzle body 18, a desired damping of the measurement signal of the apparatus for the measurement of the mass of the flowing medium can be determined beforehand.

Figure 6:
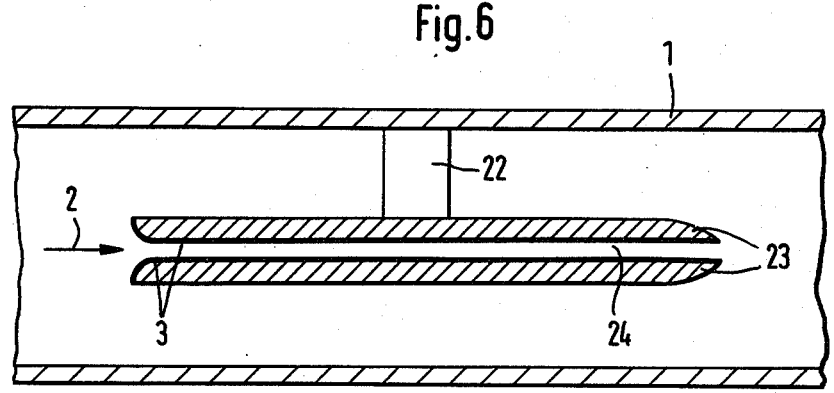
FIG. 6 is a view similar to FIG. 5 showing another embodiment of the temperature-resistant film resistor in at least one gap having a laminar gap flow constructed in accordance with the invention.

Further possibilities for stabilizing the flow are shown in the exemplary embodiments of FIGS. 5 and 6. In FIG. 5, a controlled-gap body 23 having minimum flow resistance is disposed in the flow cross section 1 via a rib 22. This body 23 has a narrow gap 24 parallel to the flow and extending in the flow direction and a laminar gap flow prevails in gap 24 without separations. The carrier 17, having the temperature-dependent resistor film applied on all sides, may be plate-like and disposed within the gap 24 in such a manner that gap portions 25 and 26 result on either side of the carrier 17 within each of which there is a laminar gap flow.

In the embodiment shown in FIG. 6, a controlled-gap body 23 having a gap 24 producing a laminar gap flow is similarly provided. However, in the embodiment of FIG. 6, the temperature-dependent resistor film 3 is placed upon the surface of the controlled gap body 23 defining the gap 24 so that the controlled-gap body 23 simultaneously acts as the carrier for the temperature-dependent resistor film 3.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. Apparatus for the measurement of the mass of a flowing medium such as for the measurement of induced air mass in internal combustion engines comprising
    an intake manifold having a nozzle body disposed in at least a portion of the flowing medium thereof,
    a carrier disposed upstream of a narrowest cross-section of said nozzle body,
    a hot-film, temperature dependent resistor applied upon said carrier and in a path of said flowing medium defining a region of stabilized flowing medium, said resistor having at least one of the temperature and resistance characteristics of the flowing medium for developing thereby a measurement signal indicative thereof.

2. The invention of claim 1 wherein said nozzle body includes an inner wall for producing a resultant flow cross-section which narrows steadily along the direction of flow.

3. The invention of claim 2 wherein said nozzle body has an inner surface which narrows in a manner of a nozzle and wherein said temperature-dependent resistor is applied to said inner surface.

4. The invention of claim 1 wherein said carrier is integrally constructed with said nozzle body and said resistor is applied upon said nozzle body.

5. The invention of claim 1 wherein said resistor comprises an arm of a bridge circuit and which has a second arm parallel to said arm, an output of said bridge being said measurement signal applied as an input to an amplifier providing an output valve applied to said bridge circuit.

* * * * *